May 10, 1938. J. M. LYNSKEY 2,117,185
APPARATUS FOR MEASURING THE VOLUME OF LIQUID IN A TANK
Filed Feb. 27, 1937 3 Sheets-Sheet 1

Inventor
Joseph M. Lynskey
By Thomas A. Jenckes
Attorney

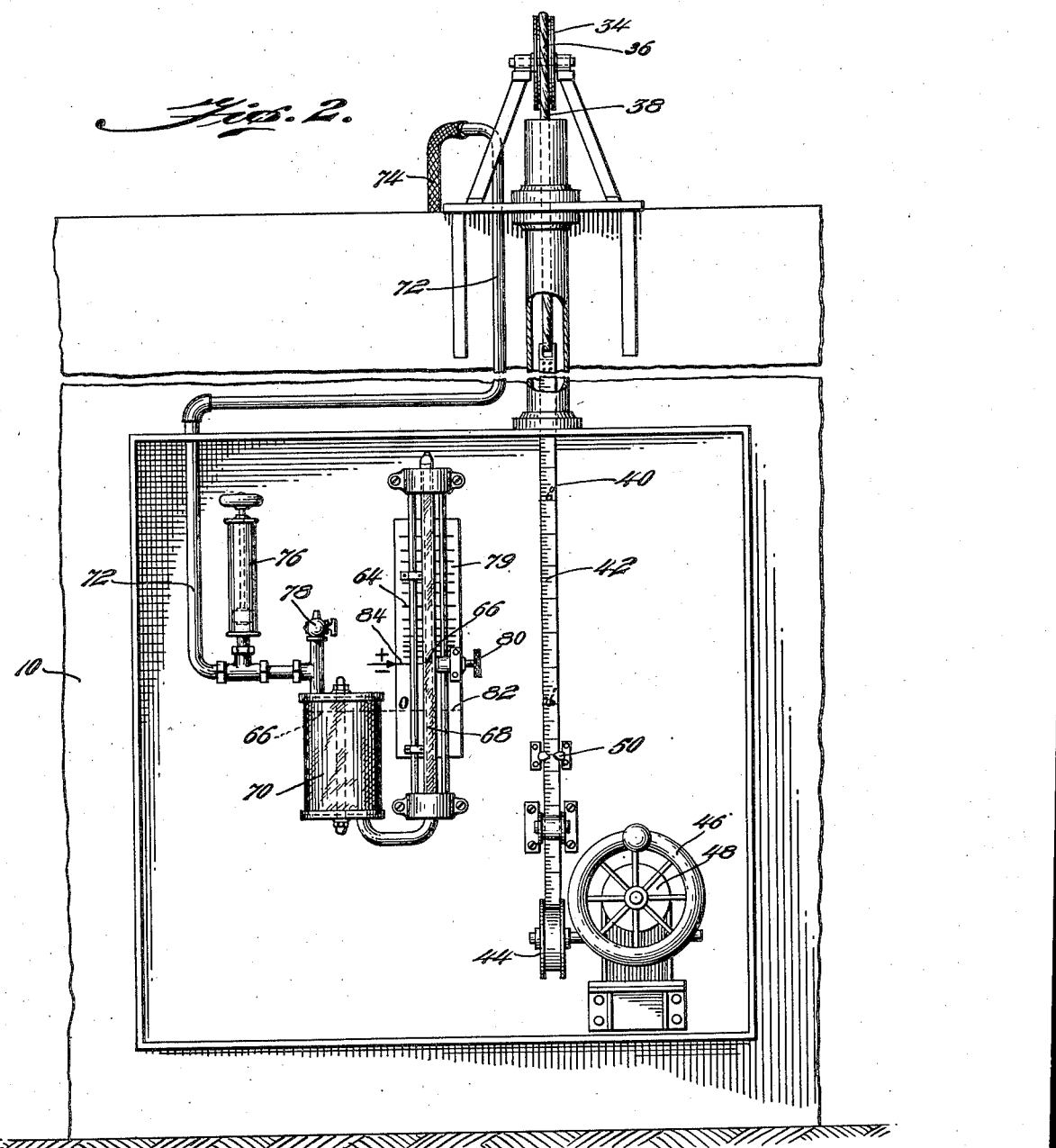

May 10, 1938.  J. M. LYNSKEY  2,117,185
APPARATUS FOR MEASURING THE VOLUME OF LIQUID IN A TANK
Filed Feb. 27, 1937  3 Sheets-Sheet 3
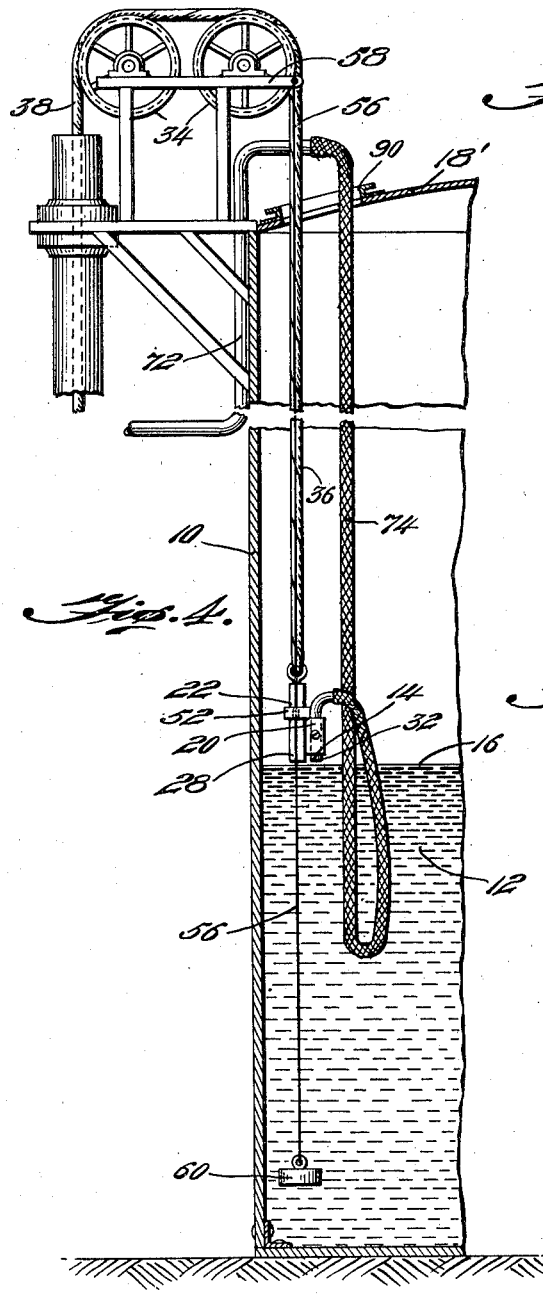
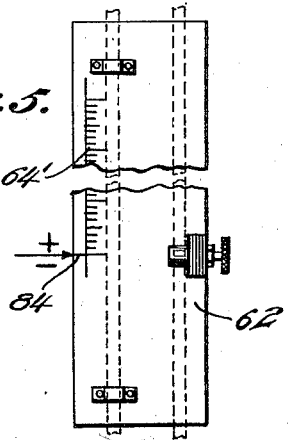
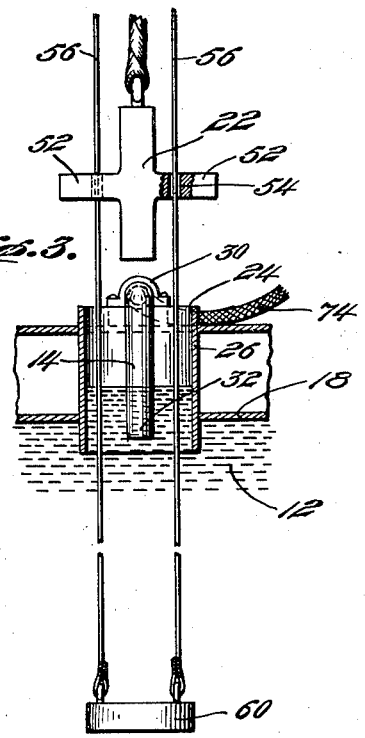
Inventor
Joseph M. Lynskey
By Thomas A. Jenckes
Attorney Patented May 10, 1938

2,117,185

UNITED STATES PATENT OFFICE 2,117,185

APPARATUS FOR MEASURING THE VOLUME OF LIQUID IN A TANK

Joseph M. Lynskey, Riverside, R. I.

Application February 27, 1937, Serial No. 128,244

11 Claims. (Cl. 73—290)

My invention relates to an apparatus for measuring the volume of liquid in a tank and is particularly adapted for use in measuring the contents of large gasoline or other types of liquid storage tanks. There are two distinct types of such tanks on the market, namely, (1) with a fixed roof on the top thereof and (2) another having a roof floating on the surface of the liquid contained therein and my invention may be modified for use with either type of tank.

An object of my invention is to measure the amount of liquid in either of such types of tanks from a point entirely without the tank thereby eliminating any possible errors due to the capillary movement of the liquid level in measuring bobs or strips inserted from the top of the tank.

A further object of my invention is to measure the height of a member immersed below the liquid level within the tank and to then correct for the displacement of said member by measuring the liquid pressure at the lower end of said immersion or displaced member in accordance with Pascal's law of liquid pressures, and transmitting said liquid pressure by means of an ordinary manometer to a point exterior of the tank at which the displacement or immersion of such immersion member is measured so that the readings of the means measuring the height at which said immersion member is displaced may be corrected for the actual amount of immersion of said member to obtain an indication of true liquid level.

A further object of my invention is to provide an immersion member of negligible displacement area to not in any appreciable amount affect the measurements.

My invention particularly relates to an apparatus for use in measuring the amount of liquid in a type of tank having a floating roof which has been extremely difficult hitherto, due to (1) variations in load on said roof and (2) variations of stresses caused by said load on the material of the roof, and my invention further relates to a novel method of empirical calibration of such a load on the roof, such calibrations representing actual load conditions.

In the actual making of tests, I have found that with variations in load thereon certain types of roofs rise and other types lower caused by different designs of the roofs which bend at different points thereon under stress and for complete accuracy it is necessary to calibrate correction factors for each individual tank even though they are of the same dimension and design.

In tanks having floating roofs at times particularly when gasoline is contained therein, gas pockets develop beneath the roof which will tend to affect the height readings heretofore mentioned. Employing my invention, however, these are additionally indicated and may be corrected by means usually provided to release such gases.

These and such other objects of my invention as may hereinafter appear will be best understood from a description of the accompanying drawings, which illustrate various embodiments thereof.

In the drawings, Fig. 1 is a fragmentary vertical sectional view through a floating roof tank having my invention attached with parts of the mechanism shown in elevation.

Fig. 2 is a fragmentary elevation of such a tank looking towards the indicating mechanism.

Fig. 3 is an enlarged detailed sectional view taken through the gauge hatch of the floating roof and showing portions of my invention in elevation.

Fig. 4 is a vertical sectional view similar to Fig. 1 of all portions of my invention shown therein, except the indicating mechanism of an embodiment of my invention applied for use on a tank having a closed roof.

Fig. 5 is a front elevation of a liquid pressure indicating scale adapted for use in the embodiment of my invention shown in Fig. 4.

Figure 1:
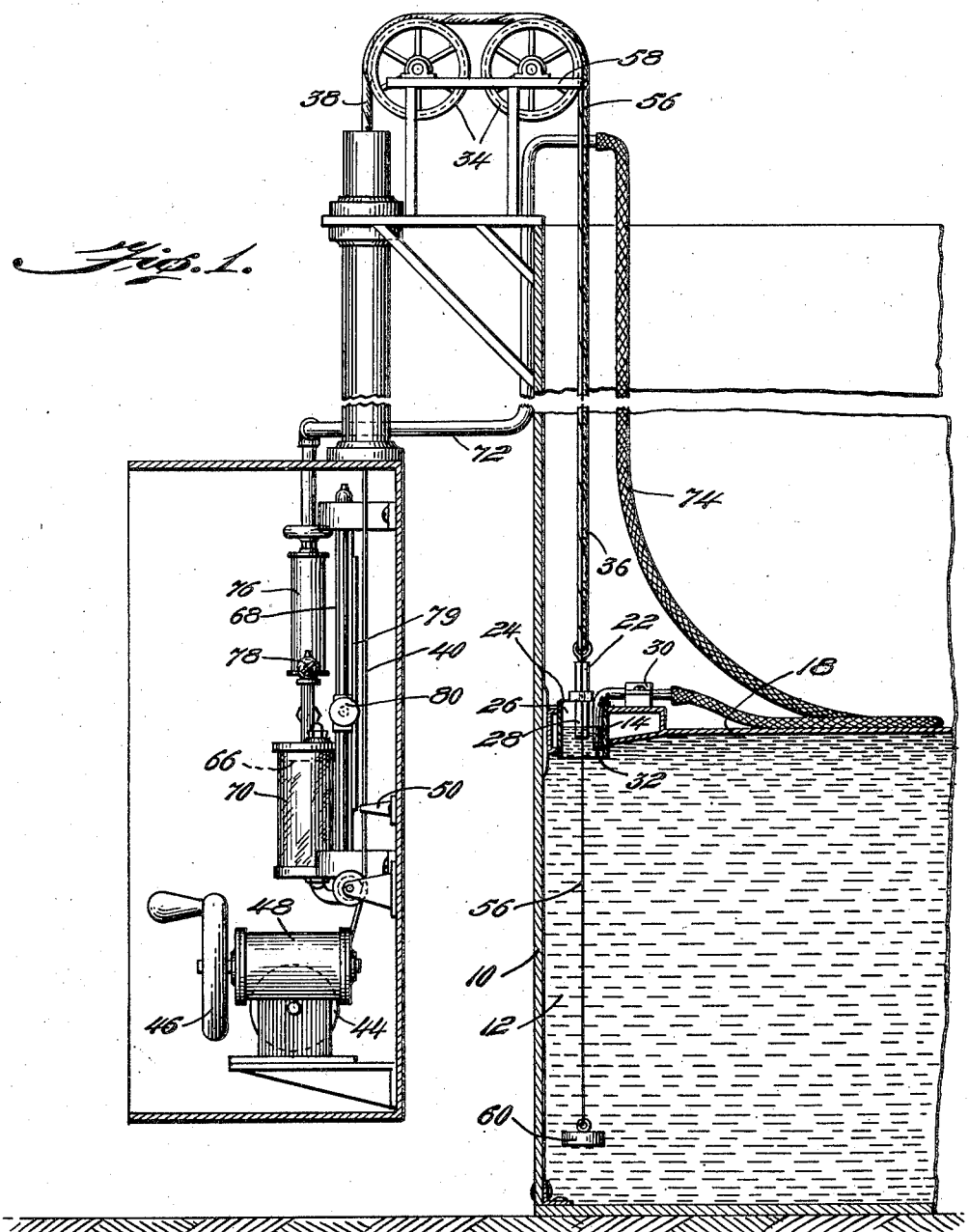

I have shown in Figs. 1–3 an embodiment of my invention adapted for use for measuring the volume of the liquid 12 within the tank 10 having the roof 18 floating on the surface of said liquid 12 to compensate for variations in load in said roof and other conditions within said tank affecting the liquid level, said roof being provided as usual with a gauge hatch which may be provided as usual with the gauge hatch tube 26. The immersion member 14 comprises a rigid tube 14 preferably constructed of copper or other suitable metal or rigid material fixedly secured to the roof 18, such as by the clamp 30 to depend a definite amount from its point of attachment to said roof within the liquid 12, in my preferred embodiment projecting downwards through said hatch tube 26 a fixed distance and having a lower end of substantially relatively negligible displacement area for immersion within said liquid 12.

I also provide a weight 22 vertically movable within said tank adapted to abut a fixed point on said roof 18 in the embodiment shown, the upper end 24 of the hatch tube 26, said point 24 being fixed relative to the lower end 32 of said tube, said weight comprising a portion of means, preferably operable from the point exterior of said tank at substantially the level of the base of said tank for measuring the height of a point 24 fixed relative to the point 32 of said member 14 relative to the liquid capacity height of the tank and preferably indicate said height at substantially said point exterior of said tank. The rest of such means will now be described. Guide means such as the guide wheels 34 are preferably mounted above said tank and cable means 36 are provided to support said weight 22 passing over said guide means 34 and extending vertically downwardly as at 38 exterior of said tank 10. A tape 40 is connected to the outer end 38 of said cable having scale indicia 42 thereon indicative of the height of said roof abutting weight 22 within said tank. A reel 44 located preferably at a point exterior of said tank at substantially the level of the base of said tank is provided for reeling the lower end of said tape 40 thereon and means such as the handwheel 46 is provided to rotate said reel 44 by means of suitable gearing 48 to raise said weight 22 and permit said weight 22 to lower itself and its connected cable 36 within said tank and raise the tape 40 exterior of said tank. I also provide a pointer 50 located at a fixed point adjacent said tape 40 to indicate on said tape scale 42 the relative height of said weight 22 and hence fixed point 24 of said roof within the tank.

If desired means are provided within said tank to insure that the weight 22 may move in a substantially vertical path within said tank and for this purpose in the embodiment shown, I have constructed the weight 22 with the laterally projecting arms 52 forming a cross head for said weight and adapted to abut the upper end 24 of said tubular hatch 26 to form a fixed point on said roof for the abutment of the weight 22 thereon. The arms 52 are also provided with the vertical holes 54 to receive the guide wires 56 projecting downwardly from suitable arms 58 fixedly mounted on or adjacent said tank through said hatch tube 26 to support a supplemental weighting means 60 at the lower ends thereof within the liquid near the lower end of the tank to positively insure that the weight 22 will move up and down in a vertical path.

The means for measuring the depth of immersion of said member 14 within the liquid 12 will now be described, which as stated hitherto, is identical for either embodiment, with the exception of the scale on the manometer or glass gauge. As stated hitherto, I preferably measure the depth of immersion of said tube 14 within said liquid by transmitting the liquid pressure in said liquid at the depth of liquid penetration of the lower end of said tube to indicate on a suitable manometer scale either the depth of immersion, such as on the scale 62, shown in Fig. 5, or a suitable height correction factor, as shown on the vertically movable scale 64, shown in Fig. 2. As stated hitherto, said means preferably takes the form of an indicating manometer modified to be particularly desirable for this purpose, said manometer broadly speaking, comprising a modified U-tube containing indicating liquid 66 having one leg thereof connected to the lower end of said rigid tube 14 and being thus open to atmosphere above the liquid level 16 and the other indicating leg having an upper end also open to the atmosphere so that the height of liquid in the leg comprising the glass gauge 68 or indicating leg may indicate the actual differences in liquid pressure only, due to the varying depths of penetration of the lower end of the tube 14 below the liquid level 16. One leg of said U-tube comprises a relatively large reservoir 70, preferably having glass walls for containing indicating liquid 66 and for reasons of accuracy, I preferably employ an indicating liquid of substantially the same specific gravity as that of the liquid in the tank. I provide tubular means 72 for connecting the oil reservoir 70 with said rigid tube 14 having a flexible portion 74 within said tank to flex to compensate for the raising or lowering of said roof 18. In the embodiment of my invention shown, I preferably employ a rigid metal pipe leading from said reservoir 70 and terminating at a point above said tank to which the flexible portion 74 may be attached which flexible portion 74 has the other end thereof attached to the rigid tube 14. To transmit the liquid pressure through said tube 72 by means of substantially completely compressed air, I provide the air pump 76 connected to said tubular means 72 provided with the usual piston and handle for this purpose and to release the thus built up air pressure within the tube 72 between the reservoir 70 and tube 14 I provide an air vent 78 connected to said tube and comprising a standard type of handle operated air pressure valve. As stated hitherto, the U-leg 68 or manometer comprises a vertically extending transparent, preferably glass gauge 68 connected to the bottom of said reservoir 70 and I provide a measuring strip 79 vertically adjustable relative to said glass gauge by means of the adjusting set screw 80. The strip 79 is vertically adjustable not only for calibration purposes, but also to provide at all times a true zero reading, regardless of shrinkage or expansion in the liquid 66. A zero mark 82 is provided on the scale 64 on said strip 79.

In use the air vent 78 is opened and the scale 64 is vertically adjusted by means of the adjusting set screw 80 to the zero mark 82. Assuming that the liquid 12 is to be measured in the tank 10 with no load on the roof or no other adverse conditions, such as gas pockets affecting the height of the roof, the lower end 32 of the tube 14 will be immersed an unvarying amount from the roof within the liquid 12. The air vent 78 may then be closed and by means of the air pump 76 air may be pumped within the tube 72 up to its substantial limit of compressibility to cause it to transmit the liquid pressure in said liquid 12 at the then depth of liquid penetration of the lower end 32 of said tube 14 within said liquid 12 to indicate the depth of immersion of said tube 14 within said liquid and a mark 84 may be made on said scale above said zero 82 to indicate the standard depth of immersion of said tube 14 within the liquid 12 for no load on the roof or any adverse conditions.

As stated hitherto, with tanks with floating roofs variations in the depth of immersion of said tube 14 in said liquid 12 take place with variations of load on said roof and corresponding correction factors to correct the actual measurement on the tape scale 42 may be calibrated on said scale 64 for variations in load on said roof 18. The roof may be gradually loaded with water or other substance and when the pointer 50 shows ⅛" difference on the tape 40, a mark is scribed on the strip 79 to form the scale 64 on said strip which is stamped ⅛". As the weight on the roof is increased and when the scale 42 on tape 40 shows a difference of ¼" another mark is scribed in line with the height of liquid in said gauge 66 higher up on the strip 79 to form another scale mark on said strip 79. Continued marks are successively scribed on said strip 79 opposite the height of liquid 66 in said glass gauge 68 corresponding to ⅛" difference in readings of the scale 42 on the tape 40 against the pointer 50 to form the scale 64 on said strip 79 until the roof is fully loaded with water. Although the scale 42 shows uniform graduations for ⅛" variations in height on said tape 40, the graduations on the scale 64 will be uneven and the distance between successive graduations on the scale will vary. This variation is caused by difference in the design of the roof itself which affects its displacement and its bending under varying degrees of load which may even vary under different conditions of installation even if roofs of the same size and design be employed.

After the scale 64 has once been calibrated on the strip 79 to employ my device to obtain an accurate volumetric indication of the volume of liquid 12 within the tank 10 compensated for varying degrees of load, a height reading on the tape scale 42 is made, the liquid pressure proportionate to the depth of penetration of the end 32 of the tube 14 within the liquid is transmitted in the manner explained, to the glass gauge 68, namely, by initially releasing the air pressure in the tube and building up a transmitting pressure in said tube by means of the pump 76, and the level of the liquid 66 in the glass gauge 68 may be read off on the scale 64 and with a load on the roof will vary from the normal level mark 84 in amounts proportionate to said load and the correction factors to be applied to the height measurement 42 for variations in said load may be read off said scale 64 for any outage measurement. In the embodiment shown, the scales 42 and 64 have been constructed for outage measurement and thus, to obtain the volume of liquid left in the tank it will be necessary to subtract the outage measurement from the total tank capacity.

As stated, the measuring apparatus may be designed to measure either the innage or outage of the tank as shown. For example, assuming that the tank is filled to its full liquid capacity, with no extra load on the top of the roof, or no gas formed beneath the roof. The tape 40 at the pointer 50 would read zero, and the liquid level in the glass tube 68 would be level with the line 84 on the metal strip 79. Therefore, no outage is indicated. The liquid volume is the full capacity of the tank. Again assuming that a portion of the liquid has been removed from the full tank, and rain water is on the top of the roof, the measurement of the liquid volume in the tank is obtained as follows: The weight 22 is lowered until the arm 52 on the weight 22 rests on the top of gauge hatch 24. The measurement on the steel tape 40 at the pointer 50 reads 10 feet. The liquid in the glass tube 68 is level with the line marked 1½ inches on the metal strip 79—this being the type roof which rises when weight is added to the top of it. The 1½ inches indicated on the metal strip 79 is added to the tape measurement at the pointer 50, giving a corrected reading of 10 feet 1½ inches outage. This, subtracted from the height of the tank, which I will assume is 35 feet, gives an innage of 35 feet minus 10 feet 1½ inches, which equals 24 feet 10½ innage.

Explanation of how by reversing the steel tape 40, the innage could be obtained: For example, I shall assume that the same conditions exist, as mentioned in the previous explanation to obtain the outage. The tape 40 at pointer 50 in this method reads 35 feet instead of zero when the tank is filled to capacity with no extra load on top of the roof or no gas formed beneath it. Consequently, the liquid volume is the full capacity of the tank, as indicated by the measurement 35 feet on the tape 40 at pointer 50, again assuming that the same amount of liquid has been removed from the tank, and the same amount of rain water being on the top of the roof. The weight 22 is lowered until the arms 52 on the weight 22 rest on the top of gauge hatch 24. The measurement on the steel tape 40 at the pointer 50 will now read 25 feet, the weight on the roof being the same in both examples. The 1½ inches indicated on the metal strip 79 is deducted from the measurement 25 feet, giving an innage of 24 feet 10½ inches—the measurement obtained in both examples being identical.

My explanation as listed above, covering the floating roof type tank, also applies to the stationary roof type tank, drawings Fig. 4, with the following exceptions: When the steel tape 40, Fig. 2, is installed for outage measurements, the indicated correction on metal strip 62, Fig. 5, is subtracted from the measurement on steel tape 40 at pointer 50, Fig. 2. When the tape 40 is reversed and installed for innage measurement, the indicated correction is added to the measurement on steel tape 40 at pointer 50, Fig. 2.

If the height of liquid 66 in said gauge 68 is below the standard mark 84 for the standard amount of immersion of said tube 14 within the liquid 12 under normal conditions, it provides an immediate indication of gas pockets below the roof which may be discharged through suitable vents or other means normally provided for this purpose in the roof 18.

In the embodiment of my invention shown in Figs. 4 and 5 for measuring the volume of liquid in a tank having the fixed roof or stationary top 18', the cable 36 carrying the weight 22 may be lowered through the manhole 90 usually provided in said top 18' and similar weighting means 60 and supporting wires 56 may be provided to maintain the path of movement of said weight 22 in a vertical line within said liquid 12. In this embodiment of my invention, the tube 14 may be directly attached to the weight 22, such as by the strap 20 and has the lower end 32 thereof preferably in line with the lower end 28 of said weight 22 so that when the weight 22 and attached tube 14' strike the surface of the liquid an indication will be immediately made thereof by the height of liquid 66 in the gauge glass 68. In this instance, however, the scale 64' is calibrated directly in amounts proportionate to the depth of immersion of said tube 14 within the liquid 12 to give equally spaced correction factors directly proportionate thereto to be applied to the reading on the tape scale 42 to give the actual height of liquid in the tank relatively to the capacity height of said tank for calculation of the volume of liquid then in said tank.

It is understood that my invention is not limited to the various embodiments shown or methods described and that various deviations may be made therefrom without departing from the spirit and scope of the appended claims.

What I claim is:

1. A device for use in measuring the volume of a liquid within a tank having a roof floating on the surface of said liquid including means to compensate for variations in the load on said roof and other conditions within said tank affecting the liquid level, comprising an immersion member of unvarying length from a fixed point on said roof and having a substantially relatively negligible displacement area projecting slightly below the liquid level in said tank, means operable from a point exterior of said tank at substantially the level of the base of said tank for measuring the height of a point of said roof fixed relatively to said member relative to the liquid capacity height of said tank and indicate it at substantially said point exterior of said tank and means for measuring the liquid pressure in said liquid at the depth of liquid penetration of the lower end of said member to indicate the depth of immersion of said member within said liquid thereby indicating at substantially said point exterior of said tank a calibrated correction of said fixed point height measurement for calculation of the amount of liquid in said tank.

2. A device for use in measuring the volume of a liquid within a tank having a roof floating on the surface of said liquid including means to compensate for variations in the load on said roof and other conditions within said tank affecting the liquid level, comprising an immersion member of unvarying length from a fixed point on said roof, means for measuring the height of a point of said roof fixed relatively to said member relative to the liquid capacity height of said tank and means for measuring the depth of immersion of said member within said liquid thereby indicating a calibrated correction of said fixed point height measurement for calculation of the amount of liquid in said tank.

3. A device for use in measuring the volume of a liquid within a tank having a roof floating on the surface of said liquid including means to compensate for variations in the load on said roof and other conditions within said tank affecting the liquid level, comprising an immersion member of unvarying length from a fixed point on said roof, means for measuring the height of a point of said roof fixed relatively to said member relative to the liquid capacity height of said tank and means for measuring the liquid pressure in said liquid at the depth of liquid penetration of the lower end of said member to indicate the depth of immersion of said member within said liquid thereby indicating a calibrated correction of said fixed point height measurement for calculation of the amount of liquid in said tank.

4. A device for use in measuring the volume of a liquid within a tank having a roof floating on the surface of said liquid including means to compensate for variations in the load on said roof and other conditions within said tank affecting the liquid level, said roof having a gauge hatch, comprising a rigid tube fixedly secured to said roof and projecting downwardly through said hatch a fixed distance within said tank and a weight vertically oscillatable within said tank adapted to abut a fixed point on said roof relative to the lower end of said tube, guide means mounted above said tank, a cable supporting said weight passing over said guide means and extending vertically downwardly exteriorly of said tank, a tape connected to the outer end of said cable and having scale indicia thereon indicative of the height of said roof abutting weight within said tank, a reel for reeling the lower end of said tape thereon, means to rotate said reel to raise said connected tape, cable and weight within said tank and to permit said weight to lower said connected tape and cable within said tank, a pointer located at a fixed point adjacent said reel to indicate the height of said weight and hence roof on said tape scale, a reservoir for containing indicating liquid of substantially the specific gravity of the liquid in said tank, tubular means connecting said reservoir with said rigid tube having a flexible portion within said tank to flex to compensate for raising and lowering of said roof, an air pump connected to said tubular means, an air vent connected to said tubular means, a vertically extending gauge glass connected to the bottom of said reservoir, and a measuring strip vertically adjustable relative to said gauge glass having a precalibrated scale of correction factors proportionate to varying loads on said roof to apply to the roof height tape scale readings to correct them for varying loads on said roof.

5. A device for use in measuring the volume of a liquid within a tank having a roof floating on the surface of said liquid including means to compensate for variations in the load on said roof and other conditions within said tank affecting the liquid level, comprising a rigid tube fixedly secured to said roof and projecting downwardly a fixed distance within said tank and a weight vertically oscillatable within said tank adapted to abut a fixed point on said roof relative to the lower end of said tube, guide means mounted above said tank, a cable supporting said weight passing over said guide means and extending vertically downwardly exteriorly of said tank, indicating means adapted to function with said cable to indicate the height of said roof abutting weight within said tank and an indicating manometer connected to said tube to measure the liquid pressure in said liquid at the depth of liquid penetration of the lower end of said tube thereby indicating the depth of immersion thereof, said manometer having a precalibrated scale of correction factors proportionate to varying loads on said roof to apply to indications of said indicating means to correct them for varying loads on said roof.

6. A device for use in measuring the volume of a liquid within a tank comprising a rigid tube, a weight vertically oscillatable within said tank and having said tube fixedly secured thereto, guide means mounted above said tank, a cable supporting said weight passing over said guide means and extending vertically downwardly exteriorly of said tank, a tape connected to the outer end of said cable and having scale indicia thereon indicative of the height of said weight within said tank, a reel for reeling the lower end of said tape thereon, means to rotate said reel to raise said connected tube, cable and weight within said tank and to permit said weight to lower said connected tube and cable within said tank, a pointer located at a fixed point adjacent said reel to indicate the height of said weight on said tape scale, a reservoir for containing indicating liquid of substantially the specific gravity of the liquid in said tank, tubular means connecting said reservoir with said rigid tube having a flexible portion within said tank, an air pump connected to said tubular means, an air vent connected to said tubular means, a vertically extending gauge glass connected to the bottom of said reservoir and a measuring strip vertically adjustable relative to said gauge glass having a scale indicative of the depth of immersion of said rigid tube within said liquid whereby the readings on said tape scale may be corrected by the readings on said measuring strip to obtain an indication of true liquid level.

7. A device for use in measuring the volume of a liquid within a tank, comprising a rigid tube having a lower end of a substantially relatively negligible displacement area for immersion within said liquid, a weight vertically oscillatable within said tank and having said tube fixedly secured thereto, guide means mounted above said tank, a cable supporting said weight passing over said guide means and extending vertically downwardly exteriorly of said tank, weighting means located below the liquid level in said tank, guide means for said weight connected to said weighting means to maintain the path of oscillation of said weight within said tank in a vertical line, indicating means at substantially the level of the base of said tank adapted to function with said cable to indicate the height of said weight within said tank and an indicating manometer, connected to said tube to measure the liquid pressure in said liquid at the depth of liquid penetration of the lower end of said tube, having a scale indicative of the depth of immersion of said rigid tube within said liquid, said manometer being located substantially adjacent said indicating means whereby the reading of said first indicating means may be corrected by the reading on said manometer scale to obtain an indication of true liquid level.

8. A device for use in measuring the volume of a liquid within a tank, comprising a rigid tube, a weight vertically oscillatable within said tank and having said tube fixedly secured thereto, guide means mounted above said tank, a cable supporting said weight passing over said guide means and extending vertically downwardly exteriorly of said tank, indicating means adapted to function with said cable to indicate the height of said weight within said tank and an indicating manometer, connected to said tube to measure the liquid pressure in said liquid at the depth of liquid penetration of the lower end of said tube, having a scale indicative of the depth of immersion of said rigid tube within said liquid whereby the reading of said first indicating means may be corrected by the reading on said manometer scale to obtain an indication of true liquid level.

9. A device for use in measuring the contents of a tank, comprising an immersion member, means for effecting immersion of said member below the liquid level in said tank, means for measuring the height of a point on said first means movable relative to the liquid capacity height of said tank and bearing a fixed relationship to said member in its immersed measuring position, and means for measuring the liquid pressure in said liquid at the depth of immersion of the lower end of said member to indicate the depth of immersion of said member within said liquid whereby the readings of said first measuring means may be corrected for immersion of said member to obtain an indication of true liquid level.

10. A device for use in measuring the contents of a tank, comprising an immersion member having a portion having a substantially relatively negligible liquid displacement area, means for effecting immersion of said member slightly below the liquid level in said tank, means for measuring the height of a point on said first means movable relative to the liquid capacity height of said tank and bearing a fixed relationship to said member in its immersed measuring position, and means for measuring the liquid pressure in said liquid at the depth of immersion of the lower end of said member to indicate the depth of immersion of said member within said liquid whereby the readings of said first measuring means may be corrected for immersion of said member to obtain an indication of true liquid level.

11. A device for use in measuring the contents of a tank, comprising an immersion member, means for effecting immersion of said member below the liquid level in said tank, means operable from a point exterior of said tank at substantially the level of the base of said tank for measuring the height of a point on said first means movable relative to the liquid capacity height of said tank and bearing a fixed relationship to said member in its immersed measuring position, and means for measuring the liquid pressure in said liquid at the depth of immersion of the lower end of said member to indicate the depth of immersion of said member within said liquid at substantially said point whereby the readings of said first measuring means may be corrected for immersion of said member to obtain an indication of true liquid level.

JOSEPH M. LYNSKEY.